United States Patent [19]

Below et al.

[11] Patent Number: 5,127,082

[45] Date of Patent: Jun. 30, 1992

[54] FIBER OPTIC PATCH PANEL

[75] Inventors: Randall J. Below, Woodbury; Howard Reynolds, Waterbury, both of Conn.; Vasantrai Vachhani, Eden Prairie, Minn.

[73] Assignee: The Siemon Company, Watertown, Conn.

[21] Appl. No.: 673,837

[22] Filed: Mar. 22, 1991

[51] Int. Cl.⁵ ............................ G02B 6/26; B65D 1/34
[52] U.S. Cl. ...................................... 385/135; 385/136; 385/137; 206/557; 206/565
[58] Field of Search ................ 350/96.20, 96.21, 96.22, 350/96.23; 385/135, 136, 137, 59, 71; 206/316.1, 557, 558, 564, 565

[56] References Cited

U.S. PATENT DOCUMENTS

| | | | |
|---|---|---|---|
| 4,765,710 | 8/1988 | Burmeister et al. | 350/96.20 |
| 4,824,196 | 4/1989 | Bylander | 350/96.20 |
| 4,898,448 | 2/1990 | Cooper | 385/135 |
| 4,911,662 | 3/1990 | Debortoli et al. | 439/719 |
| 4,971,421 | 11/1990 | Ori | 350/96.20 |
| 5,011,257 | 4/1991 | Wettengel et al. | 350/96.20 |
| 5,024,498 | 6/1991 | Becker et al. | 350/96.22 X |
| 5,046,811 | 9/1991 | Jung et al. | 385/135 |
| 5,066,149 | 11/1991 | Wheeler et al. | 385/135 |
| 5,067,784 | 11/1991 | Debortoli et al. | 385/135 |

OTHER PUBLICATIONS

Technician's Guide to Fiber Optics, D. J. Sterling, Jr. (1987).

Primary Examiner—Brian Healy
Attorney, Agent, or Firm—Fishman, Dionne & Cantor

[57] ABSTRACT

A patch panel for optical fibers includes a tray for supporting coiled portions of the fibers, a plurality of transversely spaced apart tabs, spaced backwardly from the front end of the tray and extending perpendicularly upwardly from the tray and a plurality of modular connector assemblies each slidably mounted on said tray between respective pairs of adjacent tabs. The modular connector assemblies each include a modular connector yoke for mounting optical fiber connectors on the tray. The tray includes tracks for slidably mounting the tray in a rack.

29 Claims, 3 Drawing Sheets

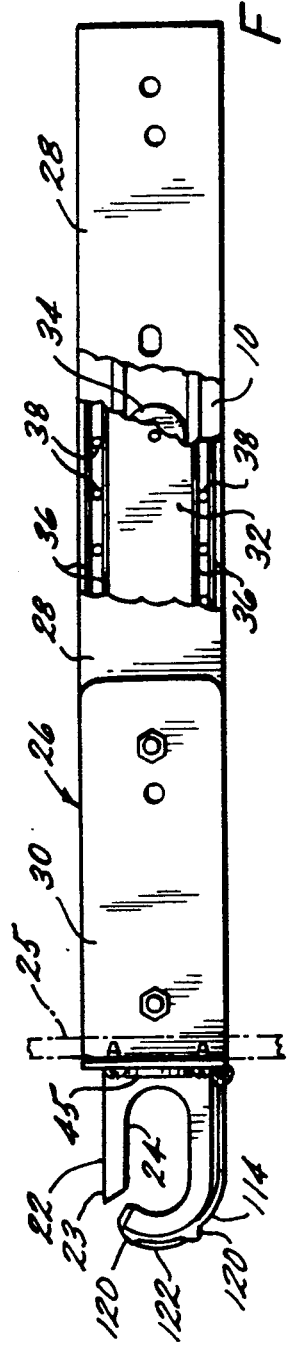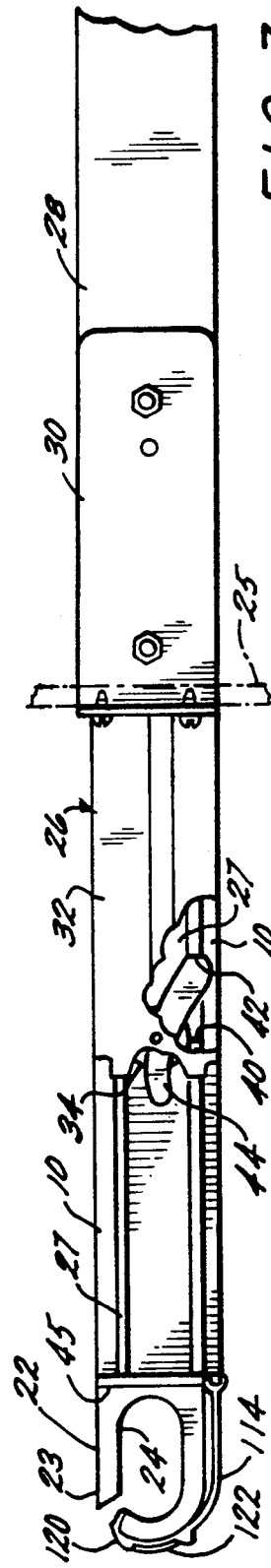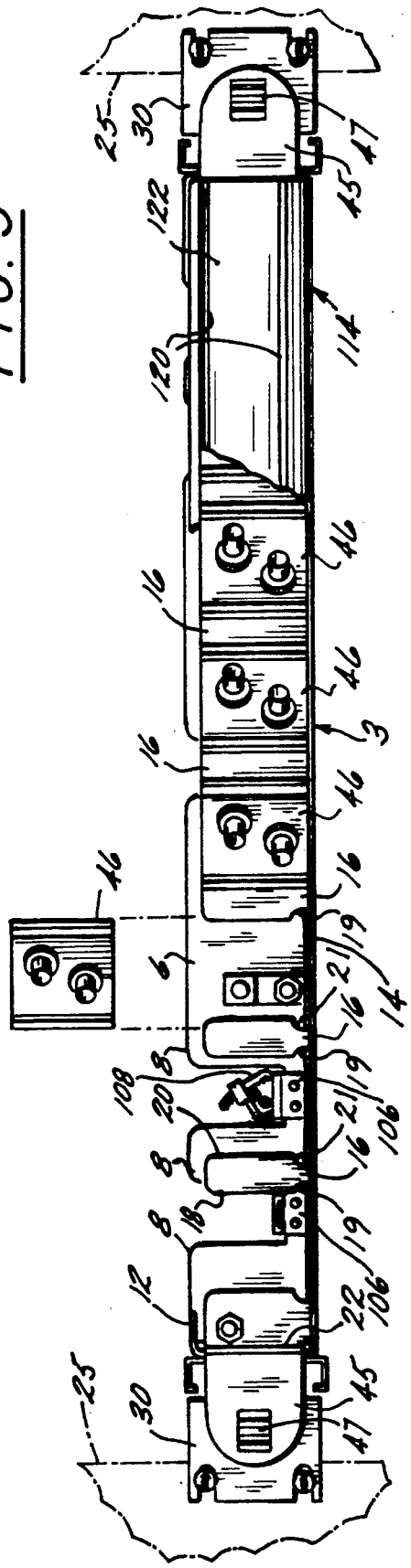

FIBER OPTIC PATCH PANEL

TECHNICAL FIELD

The present invention pertains to the field of fiber optics and more particularly to devices for making connections between optical fibers.

BACKGROUND OF THE INVENTION

Rack or cabinet mounted patch panels for organizing and protecting fiber optic cable interconnectors are known.

Typically, the patch panels include an enclosure, a tray, slidably received with the enclosure for storing cable, and a connector panel, mounted on the tray, for supporting fiber optic connectors associated with the cables. Fiber optic patch panels provide an interface between incoming fiber optic cables and optoelectronic equipment, and by providing access to an organized array of fibers and fiber connections, facilitate fiber splicing of optical and testing of the fiber optic system.

Known fiber optic patch panels are deficient in several respects.

Known fiber optic patch panels provide no means for designating service or destination of connected fiber optic cables other than conventional labels that detract from product aesthetics and are difficult to revise as installation changes are made. They are restrictive in that they cannot easily accommodate multiple cable connector types on the same panel and do not permit replacement with new connector types as user needs and interface standards evolve.

Once installed, known fiber optic patch panels are difficult to access for change or repair related work in that they are fixedly attached to equipment frames and must be either fully dismanteled in order to access, splice or cable connections within the panel or must be approached from the rear which is often obscured by multiple feeder cables and other equipment thereby making it difficult to service. Because these limitations often make it necessary to assemble panel connections and to perform cable routing before mounting these panel, they are difficult and cumbersome to install.

Known fiber optic patch panels also have the limitation that they lack a systematic means for routing user administered patch cords to permit an organized method for cable management without inadvertantly causing tight bend radii that are known have detrimental effects on optical fiber transmission properties and which may damage expensive cable assemblies. Poor patch cable management further inhibits the patching process by making cable identification difficult and prone to error that may result in accidental disconnection of active devices and/or inadvertent movement or disturbance of nearby connections.

Known fiber optic patch panels lack an effective integral means for securing service cable entering the tray area from the rear. Finally, because active fiber cables may pose a health hazard by causing eye damage if viewed from straight on, prior art panels with flat mounted connectors oriented perpendicular to the front surface are not desirable, those with patch connectors mounted parallel to the front surface overcome this condition, but suffer the disadvantage that connectors are difficult to identify and access for cable administration.

SUMMARY OF THE INVENTION

A patch panel for optical fibers includes a tray means for supporting coiled portions of the fibers, a plurality of transversely spaced apart tabs, recessed from the front edge of the tray and extending perpendicularly upwardly from the tray means, and a plurality of modular connector assemblies, each slidably mounted on said tray between adjacent pairs of respective tabs. Each of the connector assemblies includes a modular connector yoke having a flat yoke panel defining a mounting hole therethrough for receiving an optical fiber connector and means for mounting the yoke panel on the tray means. The means for mounting the yoke panel includes a first mounting flange, operatively associated with the first side edge of the yoke panel and defining a first slot for slidably receiving an edge of one of said tabs, and a second mounting flange, operatively associated with the second side edge of the yoke panel and defining a second slot for slidably receiving an edge of the tab adjacent to said one tab.

A preferred embodiment of the patch panel includes track means, operatively associated with the tray means, for slidably mounting the tray means in a rack to provide a retracted position wherein the tray means is retracted within the rack and an extended position wherein the tray means extends outwardly from the rack to allow access to the fibers and modular connectors.

A modular connector yoke includes a yoke panel and mounting means as described above. In a preferred embodiment the first mounting flange extends substantially perpendicularly to a first flat surface of the panel to a first bifurcated end, including a first pair of parallel opposed side walls defining a first slot therebetween and the second mounting flange extends substantially perpendicularly to the second flat surface of the panel to a second bifurcated end, including a second pair of parallel opposed side walls defining a second slot therebetween. The first and second pairs of side walls are oriented so that a plane longitudinally bisecting each of said slots is parallel to said first and second pairs of side walls and transverse to the top and bottom edges of the flat panel.

BRIEF DESCRIPTION OF THE DRAWINGS

FIG. 2 shows a partially broken away side view of the panel shown in FIG. 1, in a retracted position.

FIG. 3 shows a partially broken away side view of the panel shown in FIG. 1, in an extended position.

FIG. 4 shows a partially assembled, and partially broken away front view of the panel shown in FIG. 1.

DETAILED DESCRIPTION OF THE INVENTION

Figure 1:
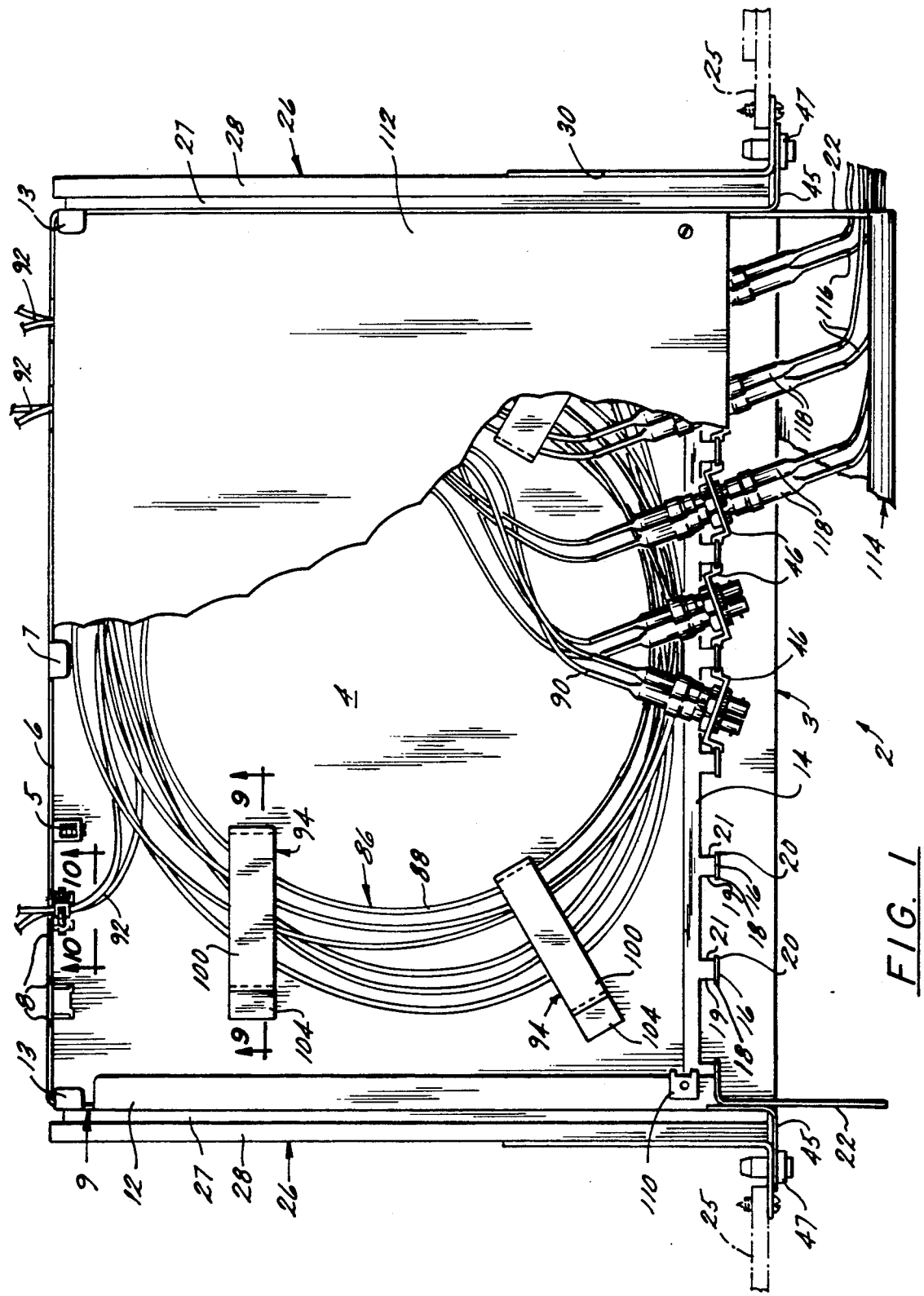
FIG. 1 shows a partially disassembled, partially broken away top plan view of the patch panel of the present invention.

The fiber optic patch panel 2 of the present invention includes a tray 3. Tray 3 includes a flat bottom panel 4 and back wall 6 extending perpendicularly upwardly from bottom panel 4 and including a plurality of edges 8 defining fiber exit slots therein and including a support 7 extending forwardly from back wall 6 and parallel to panel 4. Cable ground and strength member termination lug 5 is shown mounted near fiber exit slots. The tray 3 further includes side walls 9, each side wall including a perpendicular portion 10 extending perpendicularly upwardly from the panel 4 and a transverse portions 12, 13 extending transversely inwardly from the top of perpendicular portion 10 and parallel to panel 4. Transverse portions 13 are longitudinally and upwardly spaced apart from transverse portions 12 and 13.

The tray 3 further includes insert strip 14 secured to panel 4 and defining a row of transversely spaced apart tabs 16 recessed from the front edge of panel 4 and extending perpendicularly upwardly from panel 4. Each tab 16 includes a pair of transverse edges 18, 20. The opposed transverse edges 20, 18 of adjacent tabs define a mounting slot therebetween.

A pair of support members 22 extend forwardly from side wall portion 10. Support members 22 each include an outer edge 23, an inner edge 24 defining an aperture through support member 22 and a slot communicating between the inner and outer edges 23, 24 to provide access to the aperture.

A pair of known track assemblies 26 are mounted on the side walls 9 of the tray 3 for slidably mounting the tray 3 in an equipment rack 25 to provide a retracted position shown in FIG. 2 wherein tray 3 is retracted within the rack and an extended position shown in FIG. 3 wherein the tray extends forwardly from said rack to allow access to the contents of the tray. Each track assembly 26 includes a "U"-shaped first track 27 secured to a side wall portion 10, an second track 28 secured to a mounting flange 30 and a third track 32 slidably mounted between the first and second tracks 27, 28. Mounting flange 30 is secured to the framework of the equipment rack. A pair of rollers 34 are rotatably mounted on third track 32 and are received by inside track 27 to allow tracks 27 and 32 to be axially displaced relative to each other. A pair of bearing race members 36 and associated ball bearing members 38 are disposed between second track 28 and third track 32 to allow tracks 28 and 21 to be axially displaced relative to each other. The bottom longitudinal edge of first track 27 includes opposed first and second transverse edges 40, 42 defining an opening therebetween. A stop toggle 44 is pivotably mounted on third track 32 for contacting second transverse edge 42 of first track 27 for selectively preventing or allowing removal of first track 27 from third track 32 (and, thereby, removal of tray 3 from the equipment rack).

The panel assembly includes pair of flanges 45 extending transversely from the side wall portions 10 for limiting the axial displacement of the tray 3 relative to the mounting flanges 30. Integral to each flange 45 is a known resilient fastener assembly 47 that may be engaged to lock tray 3 in place by fastening tray flange 45 to mounting flange 30. With fasteners 47 disengaged, the track assemblies 26 permit forward displacement of tray 3 such that back wall 6 may be positioned at or forward of mounting flanges 30 when fully extended to allow unencumbered access to panel area 4 during installation and service.

A plurality of connector assemblies 46 are slidably received in each of the slots formed between adjacent tabs 16. In a preferred embodiment shown in FIGS. 5 and 6, each connector assembly 46 includes a connector yoke 48 and a pair of fiber optic connectors 50 mounted on connector yoke 48. Connector yoke 48 includes a flat panel 52 and an appropriate aperture for supporting the connectors 50. The panel 52 includes opposed front and back surfaces 54, 56, opposed top and bottom edges 58, 60, and opposed first and second side edges 62, 64. A first mounting arm 68 extends perpendicularly forwardly from the first side edge 62 of panel 52. Mounting arm 68 terminates in a bifurcated end 70 having opposed side walls 72, 74 defining a first rectilinear slot therebetween. A second mounting arm 78 extends perpendicularly rearwardly from the second side edge 64 of panel 52. Mounting arm 78 terminates in a bifurcated end 80 having opposed side walls 82, 84 defining a second rectilinear slot therebetween. An imaginary plane bisecting each of the first and second opposed slots is oriented transversely to an axis defined by the top edge of panel 52, defining an angle α therebetween.

Figure 7:
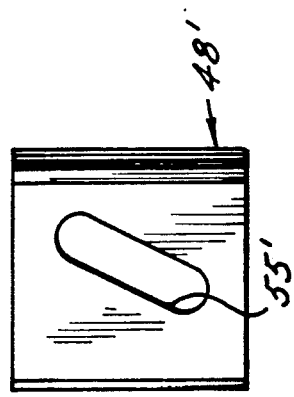
FIG. 7 shows a front view of the connector yoke of FIG. 6 without the fiber optic connectors shown in FIG. 6.
Figure 5:
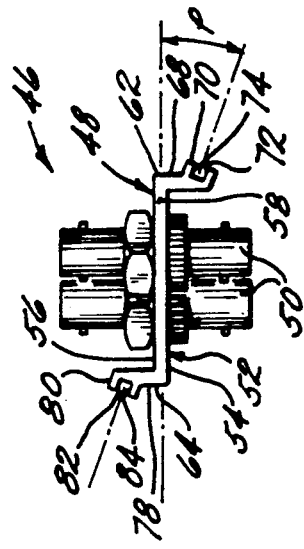
FIG. 5 shows a top view of a connector yoke and fiber optic connectors mounted therethrough.
Figure 6:
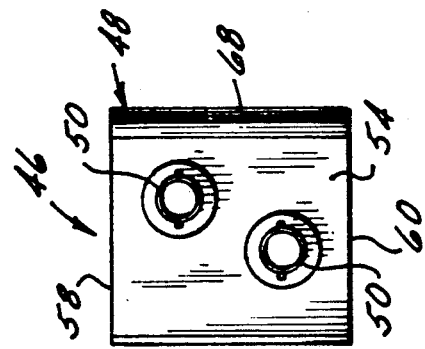
FIG. 6 shows a front view of a connector yoke and fiber optic connectors mounted therethrough.

In the embodiment shown in FIGS. 5, 6 and 7 the panel 52 defines a pair of circular holes 55, communicating between front surface 54 and back surface 56, for mounting fiber optic connectors 50 therethrough.

Figure 8:
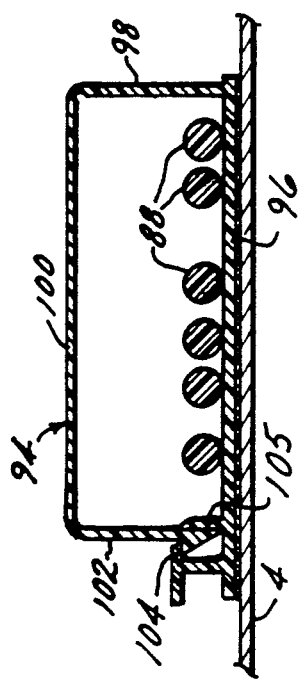
FIG. 8 shows a front view of an alternative embodiment of the connector yoke.

In an alternative embodiment shown in FIG. 8, connector yoke 48' includes a single oblong hole 55' for installing a conventional duplex fiber connector therethrough.

The yokes 48 are configured to accommodate up to two fiber optic channels to correspond to transmit and receive portions of a duplex fiber optic circuit. This modular increment of up to two connectors allows circuit identification by color coding yoke 48. Angle α is provided to avoid a direct outward orientation of optical fibers to prevent visual injury and also provide an orientation of connecting fibers that is beneficial to preferred cable arrangement. Preferably, α is a nonzero angle of up to about 85°. Most preferably, the angle α is between about 5° and about 60°.

Each of the connector assemblies 46 is mounted in a slot defined between the adjacent tabs 16 wherein the opposed edges 20, 18 defining the slot are slidably received within first and second rectilinear slots defined by bifurcated ends 70, 80, respectively, to removably secure the connector assembly to the tray 3.

It will be noted that edges 18 and 20 at tabs 16 do not extend continuously to panel surface 4, but are interrupted by surfaces 19 and 21, which are stepped in from 18 and 20 by a distance equal to or greater than the depth at the slot defined by side walls 72 and 74 at connector yoke 48. The height of surfaces 19 and 21 are approximately equal to the bend radius of tabs 16 which join along a unitary strip 14 with sufficient clearance to allow surface 58 or 60 of assembly 46 full, uninterrupted contact with panel surface 4.

Each of the panels 52 is oriented at the angle α relative to the front edge of the tray 3. As is obvious to one skilled in the art, the assemblies 46 may be mounted with top edge 58 oriented upwardly or downwardly relative to tray 3.

Figure 9:
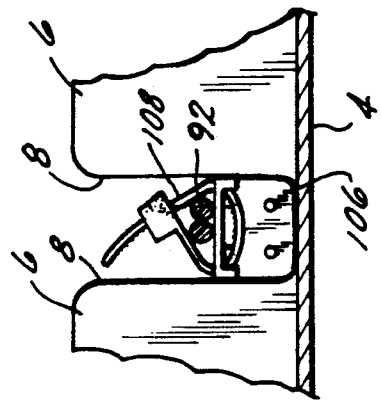
FIG. 9 shows a longitudinal cross sectional view of cable arrangement means within the panel tray.

A bundle of coiled optical fibers 86 are shown supported on the tray 3. The fibers of the bundle each includes a coiled portion 88, a first end portion 90 and a second end portion 92. The coiled portion 88 of the optical fibers are retained within known cable retention clips 94. Referring to FIG. 9, each of the clips 94 includes a base 96, a fixed side wall 98 secured to base 96, a top 100 hingeably secured to side wall 98 and a ridged side wall 102, secured to top 100 for snaplocking top 100 between projections 104, 105 defined on base 96. The clips 94 maintain the coiled portions 88 of the optical fibers within a predetermined range of bend radius.

Figure 10:
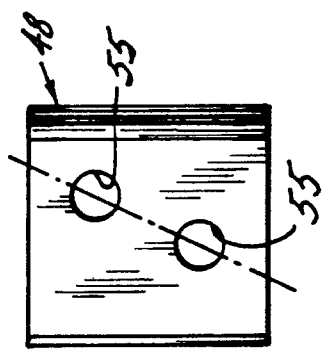
FIG. 10 shows an assembly for securing service cable entering the rear side of the panel tray.

Referring to FIGS. 1 and 10, the first end portions 90 of each of the optical fibers of bundle 86 are secured to the respective connectors 50 of the respective connector assemblies 46 removably mounted along the front of tray 3 and the second end portions 92 of the optical fibers of bundle 86 are routed through exit slots defined between edges 8 of back wall 6 and secured to slotted tie-down members 106 by ties 108.

A mounting hole 110 is provided in each of transverse portions 12 of side walls 9. Transparent or tinted top cover 112 is supported on transverse portions 12 of side walls 9, disposed beneath side wall portions 13 and secured to holes 110 to cover the tray 3. Transparent or tinted front cover 114 is snaplocked to support members 22 are interlockedly joined to front edge of surface 4 by grooved receptacle 113 to cover the front of tray 3 and the modular connector assemblies 46 secured thereto and to provide routing means for patch cables 116 mated with the front portion of connector 50.

Optical fibers 116 and associated connector portions 118 are secured to respective connectors 50. The optical fibers 116 are routed along the front edge of panel 3 under cover 114 and transversely outwardly through the apertures formed by support members 22. Front cover 114 is equipped with integral label retention ribs 120 which permits an elongated label 122 to be inserted from either end of the cover for the purpose of circuit panel identification. Label 122 and retention ribs 120 provide the additional benefit that circuit changes may be easily designated by removing and revising label markings. Finally, it should be noted that label height and position correspond to the heights of connectors so to block laser emissions of unconnected receptacles.

The interchangeable modular connector yokes of the patch panel of the present invention allow installation of a plurality of different types on connectors on the same patch panel and permit replacement of installed connectors with different types of connectors as user needs evolve.

The angled orientation of the connector yokes relative to the front of the patch panel allows connections to be mounted at a convenient angle, i.e. at an intermediate angle which avoids both the safety hazard of mounting the connections perpendicular to the first surface of the panel and the inconvenience of mounting the connectors parallel to the front surface of the panel.

The label strip on the front cover of the patch panel of the present invention and the color coding feature of the connector yokes provide quick and aesthetically pleasing means to identify particular optical fiber circuits.

The track mounting feature of the patch panel of the present invention allows easy access to the panel for servicing or reconfiguring the fibers and connectors installed in the panel.

The radially oriented clips for retaining the coiled portions of optical fibers housed within the patch panel of the present invention and the cable supports extending from the front surface of the patch panel provide systematic routing means for limiting the bend radii of the coiled fibers and of fiber optic patch cords to thereby prevent fiber damage.

The tie down members provided at the back wall of the patch panel of the present invention provide means for securing service cable entering or exiting the rear of the patch panel.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A patch panel for optical fibers, said fibers having a coiled portion, a first end portion and second end portion, comprising:

tray means for supporting said coiled portions of said fibers, said tray means including a bottom panel having a front edge, a back edge and a pair of opposed side edges;

a plurality of transversely spaced apart tabs secured to said bottom panel, said tabs being spaced backwardly from said front edge of bottom panel and extending perpendicularly upwardly from said bottom panel;

a plurality of modular connector assemblies, each slidably mounted on said tray between adjacent pairs of respective tabs, and each comprising:

modular connector yoke means for mounting optical fiber connectors on said tray means, said connector yoke means comprising:

a flat panel having a front surface, a back surface, a top edge, a bottom edge and opposed first and second side edges and defining at least one mounting hole therethrough for receiving an optical fiber connector; and means for mounting said flat panel on said tray means, comprising:

a first mounting flange, extending from the first side edge of said panel and defining a first slot for slidably receiving an edge of one of said tabs; and a second mounting flange, extending from the second side edge of said panel and defining a second slot for slidably receiving an edge of a second tab.

2. The patch panel of claim 1, wherein said tray means further comprises a back wall extending perpendicularly-upwardly from said back edge of said bottom panel and an opposed pair of side walls extending perpendicularly upwardly from said respective side edges of said bottom panel.

3. The patch panel of claim 1, wherein said back wall defines one or more exit slots for allowing second end portions of said fibers to pass out of said tray means and means, operatively associated with said exit slots, for securing said second end portions to said tray means.

4. The patch panel of claim 1, further ,comprising guide means, disposed within said tray means, for maintaining said coiled portions of said fibers within a predetermined range of bending radius.

5. The patch panel of claim 1, wherein the guide means comprises a plurality of radially oriented clips, each of said clips including a longitudinally extending base, a first side wall extending upwardly from said base, a top hingeably-secured to said first side wall, a second side wall extending downwardly from said base, and means for snaplockedly securing said second side wall to said base, wherein said first and second side walls define said range of bending radius.

6. The panel of claim 1, wherein the first mounting flange extends substantially perpendicularly from the first surface of said panel to a first bifurcated end, said first bifurcated end including a first pair of parallel opposed side walls defining said first slot therebetween;
wherein the second mounting flange extends substantially perpendicularly from the second surface of said panel to a second bifurcated end, said second bifurcated end including a second pair of parallel opposed side walls defining said second slot therebetween, and
wherein said first and second slots are oriented so that a plane longitudinally bisecting each of said slots is parallel to said first and second pairs of side walls and transverse to the top and bottom edges of the flat panel.

7. The panel of claim 1, further comprising top cover means for enclosing said tray means.

8. The panel of claim 1, further comprising a pair of cable support members extending perpendicularly upwardly and perpendicularly forwardly from said front edge of said tray means and front cover means, snaplockedly engaging said support members, for covering said modular connector means.

9. The panel of claim 1, wherein said cable support members are each ring shaped and have an outer edge, an inner edge defining an inner aperture, and a slot communicating between said inner edge and said outer edge.

10. The patch panel of claim 1, further comprising track means, operatively associated with said tray means, for slidably mounting the tray means in a rack to provide a retracted position wherein said tray means is retracted within said rack and an extended position wherein said tray means extends outwardly from said rack to allow access to said fibers.

11. A connector yoke for mounting a fiber optic connector in an opening defined by parallel spaced apart edges of a substrate, comprising:
a flat panel having opposed first and second flat surfaces, a top edge, a bottom edge and opposed first and second side edges and defining at least one aperture therethrough for receiving the connector; and
means for mounting said panel in the opening, comprising:
a first mounting flange, extending from the first side edge of said panel and providing a first slot for slidably receiving one of said opposed edges of said substrate; and
a second mounting flange extending from the second side edge of said panel and providing a second slot for slidably receiving the other of said edges of said substrate.

12. The yoke of claim 11, wherein the first mounting flange extends substantially perpendicularly from the first surface of said panel to a first bifurcated end, said first bifurcated end including a first pair of parallel opposed side walls defining said first slot therebetween;
wherein the second mounting flange extends substantially perpendicularly from the second surface of said panel to a second bifurcated end, said second bifurcated end including a second pair of parallel opposed side walls defining said second slot therebetween, and
wherein said first and second slots are oriented so that a plane longitudinally bisecting each of said slots is parallel to said first and second pairs of side walls and transverse to the top and bottom edges of the flat panel.

13. The yoke of claim 11, wherein said yoke defines two circular apertures therethrough.

14. The yoke of claim 13, wherein the apertures are diagonally offset.

15. The yoke of claim 14, wherein the centers of said circular apertures lie on a line which obliquely transverses the top and bottom edges of the panel.

16. The yoke of claim 11, wherein the yoke defines a single oblong aperture therethrough.

17. A patch panel for optical fibers, each of said fibers having a coiled portion, a first end portion and a second end portion comprising:
tray means for supporting the coiled portions of the optical fibers, said tray means including a bottom panel having a front edge, a rear edge and a pair of opposed side edges, a back wall extending perpendicularly upwardly from said rear edge and an opposed pair of side walls extending perpendicularly upwardly from said respective side edges;
modular connector means, mounted on said tray means and spaced backwardly from said front edge of the tray mans, for terminating end portions of said optical fibers;
track means, operatively associated with said tray means, for slidably mounting the tray means in a rack to provide a retracted position wherein said tray means is retracted within said rack and an extended position wherein said tray means extends outwardly from said rack to allow access to said fibers; and
guide means, disposed within said tray means, for maintaining said coiled portions of said fibers within a predetermined range of bending radius wherein the guide means comprises a plurality of radially oriented clips, each of said clips including a longitudinally extending base, a first side wall extending upwardly from said base, a top hingeably secured to said first side wall, a second side wall extending downwardly from said base, and means for snaplockedly securing said second side wall to said base, wherein said first and second side walls define said range of bending radius.

18. The patch panel of claim 17, wherein said back wall defines one or more exit slots for allowing second end portions of said fibers to pass out of said tray means and means, operatively associated with said exit slots, for securing said second end portions to said tray means.

19. The patch panel of claim 17, wherein said track means comprises a pair of track assemblies, each of said track assemblies comprising:
a longitudinally extending first rail secured to a respective one of the side walls;
a longitudinally extending second rail parallel to the first rail and having a plurality of longitudinally spaced apart roller members rotatably mounted on said second rail and received by said first rail;
a longitudinally extending third rail slidably mounted on said second rail;
a mounting flange means, secured to said third rail, for securing said third rail to the rack;
first stop means for limiting outward travel of said tray means relative to said mounting flange to define the extended position; and second stop means for limiting inwardly directed travel of said tray means relative to said mounting flange to define the retracted position.

20. The panel of claim 17, further comprising top cover means for enclosing said tray means.

21. The panel of claim 17, further comprising a pair of support members extending perpendicularly upwardly and perpendicularly forwardly from said front edge of said tray means and front cover means, snaplockedly engaging said support members, for covering said modular connector means.

22. The panel of claim 21, wherein said support members are each ring shaped, have an outer edge and an inner edge defining an inner aperture, and a slot communicating between said inner edge and said outer edge.

23. The panel of claim 17, further comprising means for selectively disengaging said tray means from said track means to allow removal of the tray means from the rack.

24. The panel of claim 17, further comprising selectively engagable means for securing said tray means in said retracted position.

25. A patch panel for optical fibers, each of said fibers having a coiled portion, a first end portion and a second end portion comprising:
   tray means for supporting the coiled portions of the optical fibers, said tray means including a bottom panel having a front edge, a rear edge and a pair of opposed side edges, a back wall extending perpendicularly upwardly from said rear edge and an opposed pair of side walls extending perpendicularly upwardly from said respective side edges;
   modular connector means, mounted on said tray means and spaced backwardly from said front edge of the tray means, for terminating end portions of said optical fibers;
   track means, operatively associated with said tray means, for slidably mounting the tray means in a rack to provide a retracted position wherein said tray means is retracted within said rack and an extended position wherein said tray means extends outwardly from said rack to allow access to said fibers; and
   wherein said track means further comprises a pair of track assemblies, each of said track assemblies comprising;
   a longitudinally extending first rail secured to a respective one of the side walls;
   a longitudinally extending second rail parallel to the first rail and having a plurality of longitudinally spaced apart roller members rotatably mounted on said second rail and received by said first rail;
   a longitudinally extending third rail slidably mounted on said second rail;
   a mounting flange means, secured to said third rail, for securing said third rail to the rack;
   first stop means for limiting outward travel of said tray means relative to said mounting flange to define the extended position; and
   second stop means for limiting inwardly directed travel of said tray means relative to said mounting flange to define the retracted position.

26. The panel of claim 25, further comprising means for selectively disengaging said tray means from said track means to allow removal of the tray means from the rack.

27. The panel of claim 25, further comprising selectively engagable means for securing said tray means in said retracted position.

28. A patch panel for optical fibers, each of said fibers having a coiled portion, a first end portion and a second end portion comprising:
   tray means for supporting the coiled portions of the optical fibers, said tray means including a bottom panel having a front edge, a rear edge and a pair of opposed side edges, a back wall extending perpendicularly upwardly from said rear edge and an opposed pair of side walls extending perpendicularly upwardly from said respective side edges;
   modular connector means, mounted on said tray means and spaced backwardly from said front edge of the tray means, for terminating end portions of said optical fibers;
   track means, operatively associated with said tray means, for slidably mounting the tray means in a rack to provide a retracted position wherein said tray means is retracted within said rack and an extended position wherein said tray means extends outwardly from said rack to allow access to said fibers; and
   a pair of support members extending perpendicularly upwardly and perpendicularly forwardly from said front edge of said tray means and front cover means, snaplockedly engaging said support members, for covering said modular connector means.

29. The panel of claim 28, wherein said support members are each ring shaped, have an outer edge and an inner edge defining an inner aperture, and a slot communicating between said inner edge and said outer edge.

* * * * *